(12) United States Patent
Yoshino et al.

(10) Patent No.: US 11,708,854 B2
(45) Date of Patent: Jul. 25, 2023

(54) THRUST FOIL BEARING

(71) Applicant: NTN Corporation, Osaka (JP)

(72) Inventors: Masato Yoshino, Mie (JP); Kazuyoshi Harada, Mie (JP)

(73) Assignee: NTN CORPORATION, Osaka (JP)

( * ) Notice: Subject to any disclaimer, the term of this patent is extended or adjusted under 35 U.S.C. 154(b) by 70 days.

(21) Appl. No.: 17/425,484

(22) PCT Filed: Feb. 20, 2020

(86) PCT No.: PCT/JP2020/006801
§ 371 (c)(1),
(2) Date: Jul. 23, 2021

(87) PCT Pub. No.: WO2020/179475
PCT Pub. Date: Sep. 10, 2020

(65) Prior Publication Data
US 2022/0090627 A1  Mar. 24, 2022

(30) Foreign Application Priority Data
Mar. 1, 2019 (JP) .................. 2019-037441

(51) Int. Cl.
*F16C 17/04* (2006.01)
*F01D 25/16* (2006.01)
(Continued)

(52) U.S. Cl.
CPC .......... *F16C 17/042* (2013.01); *F01D 25/168* (2013.01); *F02C 7/06* (2013.01);
(Continued)

(58) Field of Classification Search
CPC .................................................... F16C 17/042
See application file for complete search history.

(56) References Cited

U.S. PATENT DOCUMENTS

| 6,158,892 A | 12/2000 | Stewart et al. |
| 9,689,422 B2 * | 6/2017 | Yoshino .................... F02C 6/12 |
| (Continued) | | |

FOREIGN PATENT DOCUMENTS

| JP | 02-20851 | 5/1990 |
| JP | 04-054309 | 2/1992 |
| (Continued) | | |

OTHER PUBLICATIONS

International Preliminary Report on Patentability and Written Opinion of the International Searching Authority dated Aug. 25, 2021 in International (PCT) Application No. PCT/JP2020/006801.
(Continued)

*Primary Examiner* — James Pilkington
(74) *Attorney, Agent, or Firm* — Wenderoth, Lind & Ponack, L.L.P.

(57) ABSTRACT

A thrust foil bearing 40 having a thrust bearing surface S formed by arranging a plurality of leaves 42 side by side in a circumferential direction, in which each of the leaves 42 has a top foil portion Tf that forms the thrust bearing surface S, and a ratio of a circumferential length A of the top foil portion Tf of one of the leaves 42 at a radially central position of the top foil portion Tf, to a radial length B from an inner diameter-side edge 423 to an outer diameter-side edge 424 of the top foil portion Tf is 0.66 or less.

2 Claims, 4 Drawing Sheets

(51) Int. Cl.
F02C 7/06 (2006.01)
F16C 27/02 (2006.01)
F16C 17/10 (2006.01)

(52) U.S. Cl.
CPC ............ *F16C 17/10* (2013.01); *F16C 27/02* (2013.01); *F05D 2220/30* (2013.01); *F05D 2240/52* (2013.01); *F16C 2360/23* (2013.01)

(56) References Cited

U.S. PATENT DOCUMENTS

| | | | |
|---|---|---|---|
| 9,964,143 B2* | 5/2018 | Yoshino | F16C 43/02 |
| 2006/0045396 A1* | 3/2006 | Kim | F16C 17/042 |
| | | | 384/103 |
| 2011/0103725 A1 | 5/2011 | Omori | |
| 2014/0169707 A1 | 6/2014 | Yoshino | |
| 2016/0356310 A1 | 12/2016 | Yoshino et al. | |
| 2018/0313400 A1 | 11/2018 | Yoshino et al. | |

FOREIGN PATENT DOCUMENTS

| | | |
|---|---|---|
| JP | 2002-295467 | 10/2002 |
| JP | 2002-364643 | 12/2002 |
| JP | 2003-262222 | 9/2003 |
| JP | 2009-299748 | 12/2009 |
| JP | 2013-61024 | 4/2013 |
| JP | 2015-132309 | 7/2015 |
| JP | 2017-82913 | 5/2017 |

OTHER PUBLICATIONS

International Search Report dated Apr. 14, 2020 in International (PCT) Application No. PCT/JP2020/006801.

\* cited by examiner

THRUST FOIL BEARING

TECHNICAL FIELD

The present invention relates to a thrust foil bearing.

BACKGROUND ART

A main shaft of a turbomachine (for example, a gas turbine or a turbocharger) is driven to rotate at a high speed. In addition, a turbine blade attached to the main shaft is exposed to a high temperature. Therefore, bearings supporting these main shafts are required to withstand harsh environments such as high temperature and high speed rotation. As a bearing for this type of application, an oil-lubricated rolling bearing or an oil dynamic bearing may be used, but the use of these bearings is restricted under conditions such as a case where lubrication with a liquid such as a lubricating oil is difficult, a case where it is difficult to separately provide an auxiliary machine of a lubricating oil circulation system from a viewpoint of energy efficiency, or a case where resistance due to shearing of a liquid is a problem. Therefore, an aerodynamic bearing has attracted attention as a bearing suitable for use under such conditions.

As the aerodynamic bearing, an aerodynamic bearing in which bearing surfaces on both the rotation side and the fixed side are made of a rigid body is common. However, in this type of aerodynamic bearing, if a radial bearing clearance formed between the bearing surfaces on the rotation side and the fixed side is insufficiently managed, self-excited whirling of the main shaft called whirling is likely to occur when the stability limit is exceeded. Therefore, clearance management according to the rotation speed to be used is important. In particular, in an environment where temperature changes drastically such as a gas turbine or a turbocharger, a width of the radial bearing clearance varies due to influence of thermal expansion, so that it is extremely difficult to accurately manage the clearance.

Foil bearings are known as bearings that are less likely to cause whirling and can easily manage the clearance even in environments with large temperature changes. The foil bearing has a bearing surface made of a thin film (foil) having low rigidity against bending, and flexibility, and supports a load by allowing deflection of the bearing surface. Usually, an inner peripheral surface of the bearing is formed of a thin plate called a top foil, and a spring-like member called a back foil is disposed on an outer diameter side of the thin plate to elastically support a load applied to the top foil by the back foil. In this case, when the shaft rotates, an air film is formed between an outer peripheral surface of the shaft and an inner peripheral surface of the top foil, and the shaft is supported in a non-contact manner.

In the foil bearing, since an appropriate radial bearing clearance is formed according to operating conditions such as a rotation speed of the shaft, the load, and an ambient temperature due to the flexibility of the foil, the foil bearing has a feature of excellent stability, and can be used at a high speed as compared with a general aerodynamic bearing. In addition, it is necessary to manage the radial bearing clearance of a general fluid dynamic bearing on the order of $1/1000$ of a shaft diameter, and for example, it is necessary to always secure the radial bearing clearance of about several $\mu m$ for the shaft having a diameter of about several mm. Therefore, in consideration of tolerances at the time of manufacturing and thermal expansion in a case where a temperature change is severe, strict clearance management is difficult. In contrast, in the case of the foil bearing, it is sufficient to manage the radial bearing clearance of about several tens of $\mu m$, and there is an advantage that the manufacturing and the clearance management are facilitated.

As the foil bearing, there are known a foil bearing in which the top foil is elastically supported by a cut-and-raised portion provided in the back foil (Patent Literature 1), a foil bearing in which a bearing foil is elastically supported by an elastic body obtained by knitting element wires in a net shape (Patent Literature 2), a foil bearing in which a support portion that is in contact with an inner surface of an outer ring and does not move in a circumferential direction and an elastic portion that is elastically bent by a surface pressure from the top foil are provided in the back foil (Patent Literature 3), and the like.

As a type of the foil bearing, there is also a foil bearing called a leaf type in which the back foil is not provided, the top foil is divided in the circumferential direction to form leaf foils, the leaf foils are provided at a plurality of positions in the circumferential direction while overlapping portions thereof, and a spring property is obtained at overlapping portions of the leaf foils. As this leaf type foil bearing, there are known a foil bearing in which a fixed bearing ring is divided into a plurality of arc-shaped ring members in the circumferential direction, one end of the foil is welded to a joint end of each arc-shaped ring member, and a Rayleigh step is bent and formed on the foil (Patent Literature 4), a foil bearing in which a leaf is formed of a piezo bimorph (Patent Literature 5), a foil bearing in which the leaf foil is formed of a bimetal made of two kinds of metals having different linear expansion rates (Patent Literature 6), and the like.

CITATIONS LIST

Patent Literature

Patent Literature 1: Japanese Patent Application Laid-Open No. 2002-364643
Patent Literature 2: Japanese Patent Application Laid-Open No. 2003-262222
Patent Literature 3: Japanese Patent Application Laid-Open No. 2009-299748
Patent Literature 4: Japanese Patent Publication No. H02-20851
Patent Literature 5: Japanese Patent Application Laid-Open No. H04-54309
Patent Literature 6: Japanese Patent Application Laid-Open No. 2002-295467

SUMMARY OF INVENTION

Technical Problems

In the bearing having the leaf foil described above, it is a problem to secure a predetermined or more load capacity of the bearing as bearing performance.

Solutions to Problems

In order to solve the above problem, the present invention is a thrust foil bearing having a bearing surface formed by arranging a plurality of leaves side by side in a circumferential direction, in which each of the leaves has a top foil portion that forms the bearing surface, and a ratio of a circumferential length of the top foil portion of one of the leaves at a radially central position of the top foil portion, to a radial length from an inner diameter-side edge to an outer diameter-side edge of the top foil portion is 0.66 or less.

As in the present invention, by setting the ratio of the circumferential length of the top foil portion to the radial length of one of the leaves to 0.66 or less, a predetermined number or more of leaves can be arranged in the circumferential direction of the bearing, and the load capacity of the bearing can be secured to a certain level or more.

As the thrust foil bearing described above, the ratio of the circumferential length of the top foil portion of one of the leaves at the radially central position of the top foil portion, to the radial length from the inner diameter-side edge to the outer diameter-side edge of the top foil portion can be 0.55 or more. Thus, the number of leaves can be set to a predetermined number or less, the load capacity of the bearing can be secured to a certain level or more, manufacturing cost of the bearing can be suppressed, and reliability of product performance can be improved.

As the thrust foil bearing described above, the ratio of the circumferential length of the top foil portion of one of the leaves at the radially central position of the top foil portion, to the radial length from the inner diameter-side edge to the outer diameter-side edge of the top foil portion can be 0.6. Thus, the bearing can be configured with the minimum number of leaves that can secure the load capacity of the bearing of a predetermined level or more, the load capacity of the bearing can be secured to a certain level or more, the manufacturing cost of the bearing can be suppressed as much as possible, and the reliability of the product performance can be further improved.

Advantageous Effects of Invention

According to the thrust foil bearing of the present invention, the load capacity of the bearing can be secured to a certain level or more.

DESCRIPTION OF EMBODIMENT

Hereinafter, an embodiment according to the present invention will be described with reference to the drawings.

Figure 1:
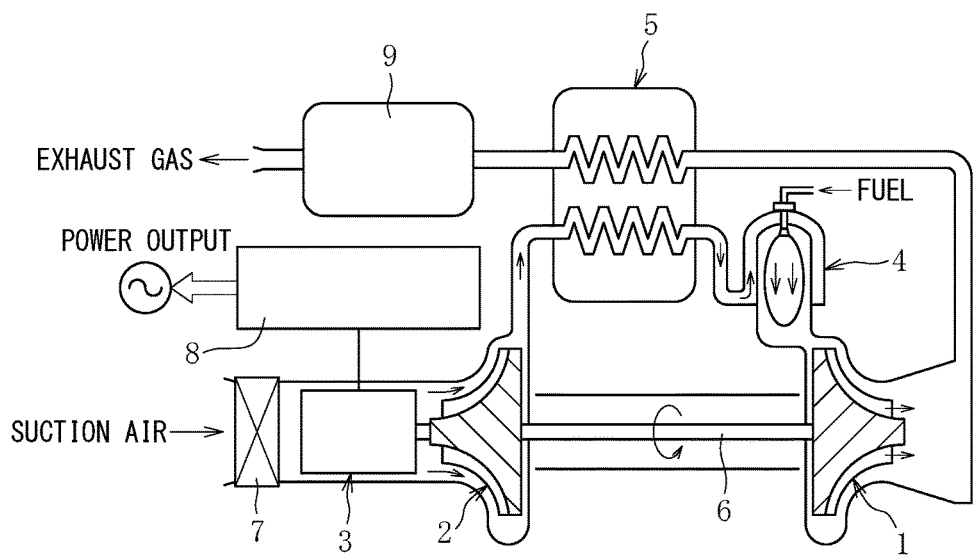
FIG. 1 is a diagram conceptually illustrating a configuration of a gas turbine.

FIG. 1 conceptually illustrates a configuration of a gas turbine that is a type of turbomachine. The gas turbine mainly includes a turbine 1 and a compressor 2 each having a blade row, a generator 3, a combustor 4, and a regenerator 5. The turbine 1, the compressor 2, and the generator 3 are provided with a common rotating shaft 6 extending in the horizontal direction, and the rotating shaft 6, the turbine 1, and the compressor 2 constitute a rotor that can rotate together.

The air sucked from an intake port 7 is compressed by the compressor 2, heated by the regenerator 5, and then sent to the combustor 4. Fuel is mixed with this compressed air and burned, and the turbine 1 is rotated by high-temperature and high-pressure gas. A rotational force of the turbine 1 is transmitted to the generator 3 via the rotating shaft 6, the generator 3 rotates to generate power, and the power is output via an inverter 8. Since the gas after rotating the turbine 1 has a relatively high temperature, the gas is sent to the regenerator 5 to exchange heat with the compressed air before combustion, so that the heat of the gas after combustion is reused. The gas that has undergone heat exchange in the regenerator 5 is discharged as exhaust gas after passing through the exhaust heat recovery device 9.

Figure 2:
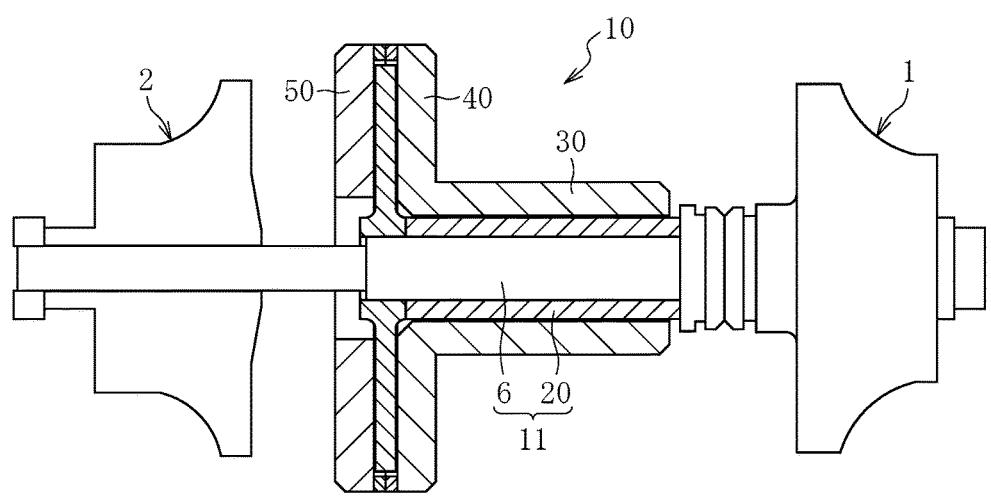
FIG. 2 is a cross-sectional view illustrating a support structure of a rotor in the gas turbine.

FIG. 2 illustrates a foil bearing unit 10 that supports the rotating shaft 6 of the rotor in the gas turbine. The foil bearing unit 10 includes the rotating shaft 6, a rotating member 20 fixed to the rotating shaft 6, a radial foil bearing 30, a first thrust foil bearing 40, and a second thrust foil bearing 50. The rotating shaft 6 and the rotating member 20 that rotate integrally form a shaft member 11. The radial foil bearing 30 supports the shaft member 11 in a radial direction, and the first thrust foil bearing 40 and the second thrust foil bearing 50 support the shaft member 11 in both thrust directions.

Figure 3:
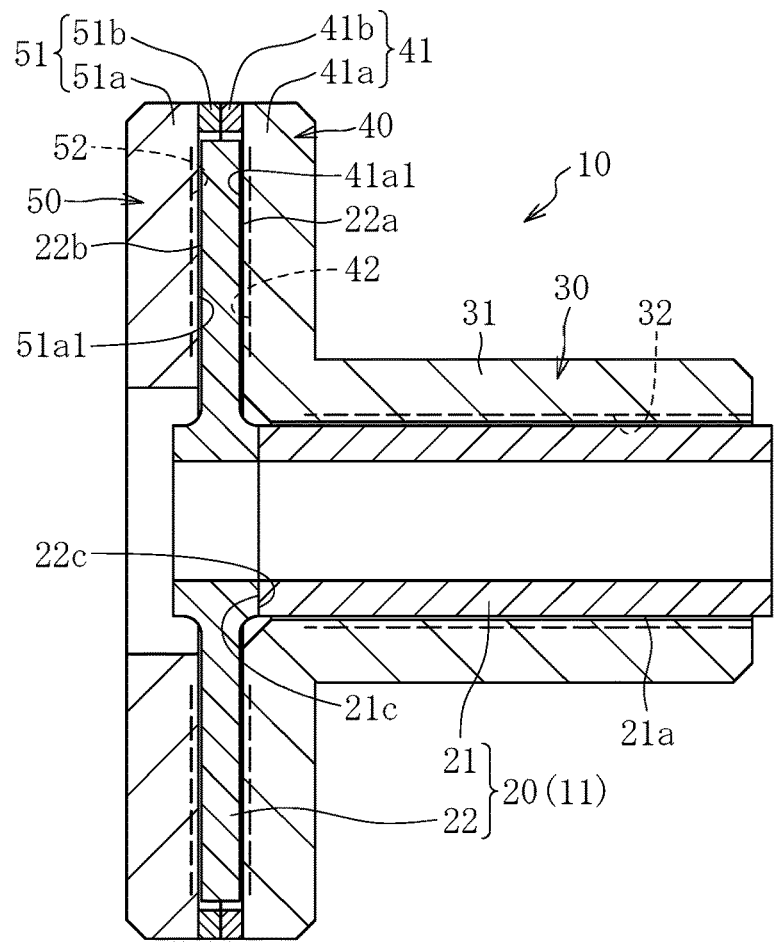
FIG. 3 is a cross-sectional view of a foil bearing unit incorporated in the support structure.

As illustrated in FIG. 3, the rotating member 20 includes a sleeve portion 21 and a disk-shaped flange portion 22 projecting outward from the sleeve portion 21. The flange portion 22 is formed of, for example, a carbon fiber reinforced composite material, and the sleeve portion 21 is formed of, for example, a carbon sintered material.

Hereinafter, a configuration of the first thrust foil bearing 40 will be described. Since a configuration of the second thrust bearing 50 is common to that of the first thrust bearing 40, description thereof will be omitted.

Figure 4:
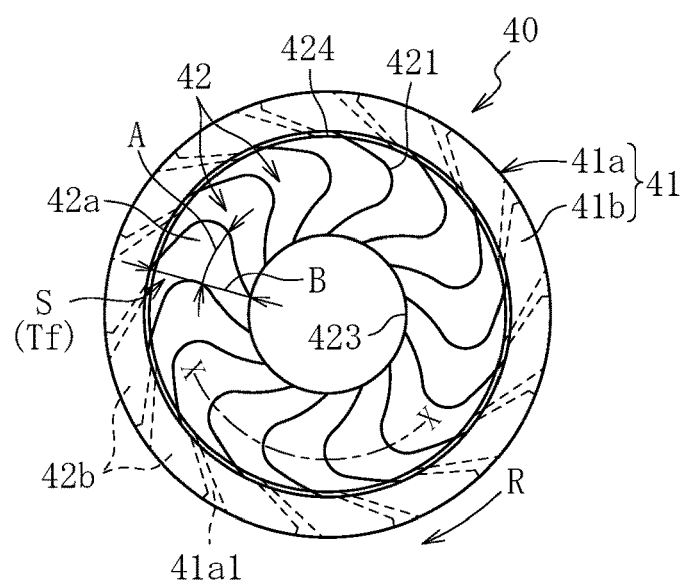
FIG. 4 is a plan view of the thrust foil bearing as viewed from the bearing surface side.

As illustrated in FIG. 3, the first thrust foil bearing 40 supports the flange portion 22 of the shaft member 11 (rotating member 20) from one side in the axial direction, and as illustrated in FIGS. 3 and 4, includes a foil holder 41 and a plurality of leaves 42 attached to the foil holder 41 so as to form a strip shape in a circumferential direction thereof. The foil holder 41 includes a disk-shaped holder body 41a having a hole at an axial center thereof, and an annular fixing member 41b provided at an outer diameter end of an end surface 41a1 of the holder body 41a. The leaves 42 are sandwiched between the holder body 41a and the fixing member 41b from both sides in the axial direction, so that the leaves 42 are held by the foil holder 41.

The leaf 42 is formed of a leaf material having a thickness of about 20 μm to 200 μm, which is made of a metal having excellent spring property and good processability, for example, a steel material or a copper alloy. As the leaf material, a material made of stainless steel or bronze is preferably used.

Figure 5:
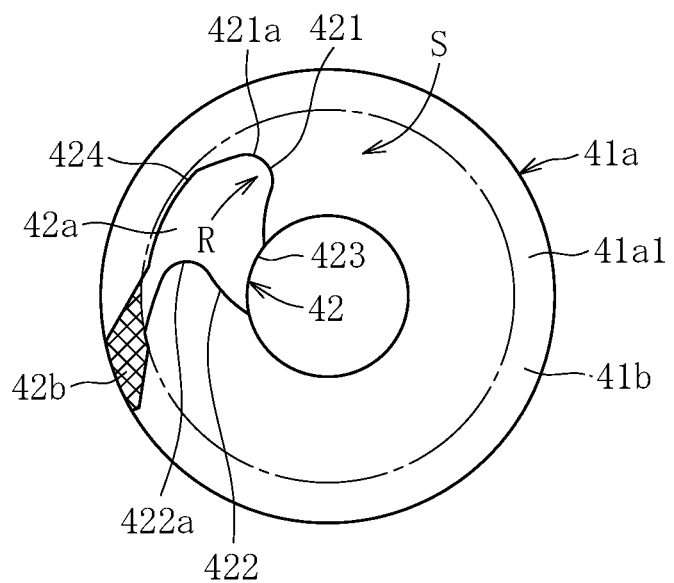
FIG. 5 is a plan view illustrating a leaf of the thrust foil bearing.

As illustrated in FIG. 4, the leaves 42 are arranged at a plurality of positions in a rotation direction R (circumferential direction) at equal pitches. FIG. 5 illustrates only one leaf 42 out of the leaves 42 arranged in the rotation direction R, and does not illustrate the other leaves. As illustrated in FIG. 5, each leaf 42 integrally includes a main body portion 42a constituting a top foil portion Tf and a back foil portion Bf to be described later, and an extension portion 42b (indicated by cross-hatching) extending from the main body portion 42a toward an outer diameter side thereof.

The main body portion 42a of the leaf 42 has a front end 421 located at an end portion on the rotation direction R side, a rear end 422 located at an end portion on the counter-rotation direction side, and an inner diameter side edge 423 and an outer diameter side edge 424 (which are also an inner diameter side edge and an outer diameter side edge of the top foil portion) connected to both side ends of the front end 421. Both the inner diameter side edge 423 and the outer diameter side edge 424 of each leaf 42 are formed of an arc centered on the axial center. The front end 421 and the rear end 422 have a so-called herringbone shape, the front end 421 is formed in a convex shape in which a region between both ends thereof projects toward the rotation direction R side, and the rear end 422 is formed in a concave shape in which the region between both ends thereof is recessed toward the rotation direction R side. The front end 421 and the rear end 422 have tops 421a and 422a in an approximately central region in the radial direction. By forming the front end 421 and the rear end 422 in a herringbone shape in this manner, it is possible to obtain an action of drawing a fluid (for example, air) into a radially central region of a thrust bearing clearance during rotation of the shaft member 11, and to increase a load capacity of the thrust foil bearing. In the present embodiment, a case where contour shapes of both tops 421a and 422a are formed in an arc is exemplified.

The extension portion 42b is formed to extend in an inclined direction with respect to the radial direction by retracting the outer diameter side in the counter-rotation direction from an outer diameter end of the main body portion 42a. As illustrated in FIG. 4, the extension portions 42b arrayed in the rotation direction R are arranged on the same plane of the holder body 41a with a clearance in the rotation direction R, without overlapping each other. The fixing member 41b is disposed on the extension portions 42b arranged on the holder body 41a, an outer diameter portion (indicated by cross-hatching in FIG. 5) of the extension portion 42b of each leaf 42 is sandwiched between the holder body 41a and the fixing member 41b, and both the members 41a and 41b are fastened and fixed with bolts or the like, so that each leaf 42 is fixed to the foil holder 41.

Figure 6:
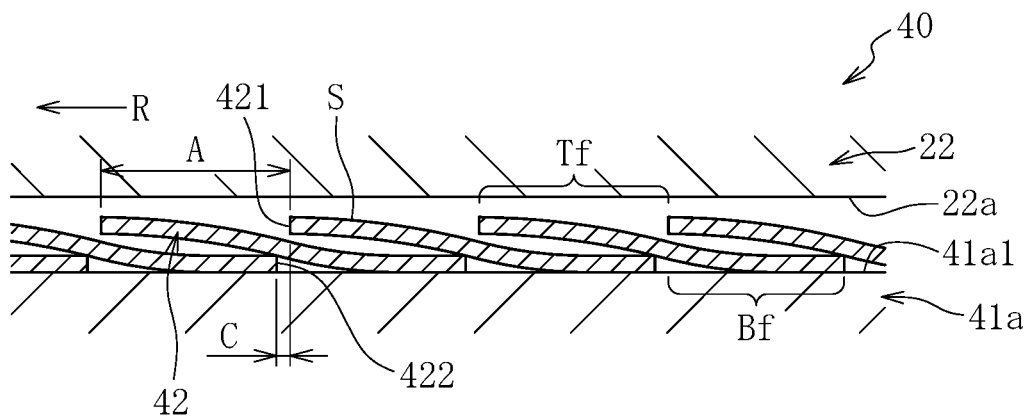
FIG. 6 is a developed view of a cross-section taken along a line X-X in FIG. 4.

FIG. 6 is a cross-sectional view taken along a line X-X in FIG. 4. As illustrated in FIG. 6, the leaves 42 of the first thrust foil bearing 40 are arranged on the end surface 41a1 of the holder body 41a so as to partially overlap each other in the rotation direction R while shifting a phase thereof by a half pitch of each leaf 42. A region on a leading side in the rotation direction including the front end 421 of each leaf 42 constitutes the top foil portion Tf that overlies an adjacent leaf 42. In addition, a region on the counter-rotation direction side including the rear end 422 of each leaf 42 constitutes the back foil portion Bf that elastically supports the top foil portion Tf, behind the top foil portion Tf of the adjacent leaf 42. A surface of the top foil portion Tf of each leaf 42 forms a thrust bearing surface S that faces one end surface 22a of the flange portion 22. The leading side in the rotation direction of the top foil portion Tf of each leaf 42 is a portion closest to the flange portion 22 and having a minimum bearing clearance.

As illustrated in FIG. 4, when a circumferential length (in other words, a circumferential distance between the top 421a of the leaf 42 and a top 421a of a leaf 42 adjacent to the leaf 42) of the top foil portion Tf at a radially central position of the top foil portion Tf is a length A, a radial length (in other words, the radial length from the inner diameter side edge 423 of the leaf 42 to an inner diameter of the fixing member 41b) from the inner diameter side edge 423 to the outer diameter side edge 424 of the top foil portion Tf is a length B, and a ratio of the length A to the length B is a leaf aspect ratio, the leaf aspect ratio is set to approximately 0.6 in the present embodiment. Note that the length A can be obtained as a value obtained by multiplying an average value of the inner diameter of the fixing member 41b and a diameter of an inner circle formed by the inner diameter side edges 423 of the leaves 42 by 7C and by dividing the obtained value by the number of leaves 42 provided in the foil bearing 40.

As the number of leaves 42 in the circumferential direction increases, that is, as a length of a portion constituting the top foil portion Tf of one of the leaves 42 decreases, the length A decreases. In other words, as the length A decreases, the leaf aspect ratio decreases, and the number of leaves 42 constituting the foil bearing 40 increases. As the number of leaves 42 increases, a maximum load capacity of the foil bearing 40 increases, but on the other hand, an increase in the number of leaves 42 increases cost and variations in bearing performance.

In the present embodiment, by setting the leaf aspect ratio to approximately 0.6, it is possible to set the minimum number of leaves 42 that can secure a certain amount or more of the load capacity (details will be described later).

As a method of manufacturing the thrust foil bearing 40 described above, one foil bearing in which half of the leaves 42 arranged in the circumferential direction of the thrust foil bearing 40 are arranged at equal intervals in the circumferential direction, more specifically, one foil bearing in which the leaves 42 of the foil bearing 40 are arranged every other, and the other foil bearing are prepared. Then, the one foil bearing and the other foil bearing are overlapped in a state where the leaves 42 of the one foil bearing and the leaves 42 of the other foil bearing are shifted in the circumferential direction by a half pitch of the leaf 42. In this state, the leaves 42 are fixed to the foil holder 41 by being sandwiched between the holder body 41a and the fixing member 41b and fastening and fixing both the members 41a and 41b with bolts or the like. This enables the thrust foil bearing 40 to be manufactured.

Figure 7:
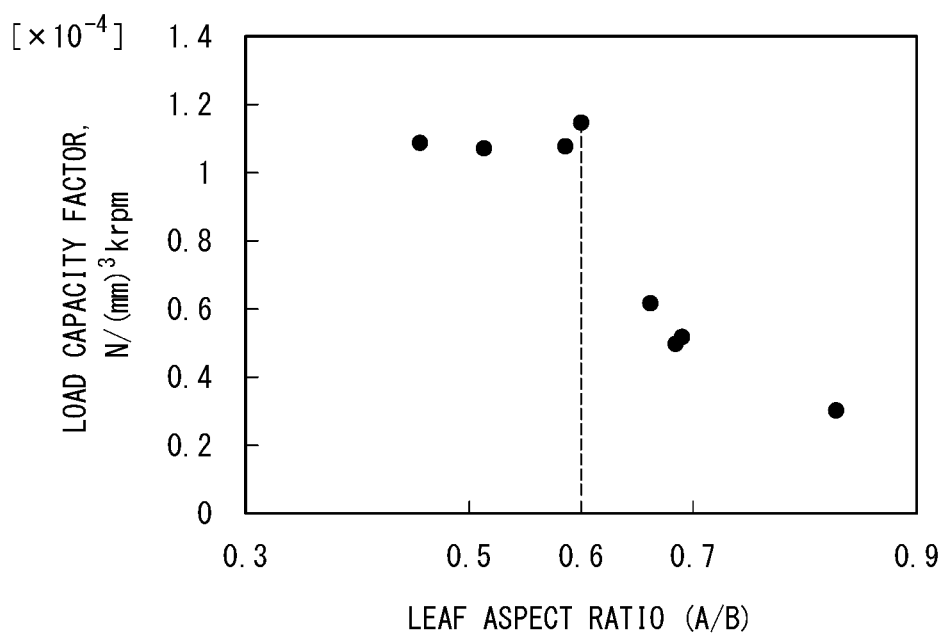
FIG. 7 is a diagram illustrating a result of an experiment on a relationship of a load capacity coefficient of the bearing with respect to a leaf aspect ratio.

Next, experimental results on a relationship between the leaf aspect ratio and a load capacity factor of the foil bearing 40 are shown in FIG. 7. In this experiment, the number of leaves (that is, the length A) was changed without changing the radial length (that is, the length B) of the bearing surface, and a change in the load capacity factor at that time was measured. Note that the load capacity factor $[N/(mm)^3 krpm]$ can be obtained by the equation (1) below, where the maximum load capacity of the foil bearing 40 is $N_{MAX}[N]$, the radial length between the inner diameter side edge 423 and the outer diameter side edge 424 (the same as the length B described above) is $L_a[mm]$, the average value of the diameter of the inner diameter side edge 423 and the diameter of the outer diameter side edge 424 is $L_b[mm]$, and a rotation speed of the shaft member 11 is $V[krpm]$:

$$N_{MAX}/\{(\pi \times L_a \times L_b) \times (L_b \times V)\} \qquad (1).$$

As illustrated in FIG. 7, the load capacity factor decreases as the leaf aspect ratio increases, that is, as the number of leaves decreases, and particularly, the load capacity factor decreases significantly with the leaf aspect ratio of 0.6 as a boundary. Specifically, when the leaf aspect ratio is 0.7 or more, the load capacity factor is significantly lower than 1.0. On the other hand, when the leaf aspect ratio is 0.66 or less, the load capacity factor has a certain value or more, and particularly when the leaf aspect ratio is 0.6 or less, there is no large difference in the load capacity factor, and the value of 1.0 or more is recorded.

Thus, when the leaf aspect ratio is 0.66 or less, particularly 0.6 or less, a sufficiently large load capacity factor can be secured. Then, as described above, considering that it is preferable to reduce the number of leaves as much as possible in terms of cost and bearing reliability, the leaf aspect ratio is more preferable as it approaches 0.6. More specifically, in consideration of the cost and reliability of the bearing, the leaf aspect ratio is preferably 0.55 or more. Further, as in the above embodiment, by setting the leaf aspect ratio to about 0.6, the magnitude of the load capacity can be secured and the number of leaves can be minimized, which is most preferable.

Although the embodiment of the present invention has been described above, the present invention is not limited to the above-described embodiment, and it is obvious that various modifications can be made without departing from the gist of the present invention. The shape of the bearing is an example, and it is a matter of course that the shape is not limited to the shape describe above.

REFERENCE SIGNS LIST

1 Turbine
2 Compressor
3 Generator
4 Combustor
5 Regenerator
6 Rotating shaft
7 Intake port
8 Inverter
9 Exhaust heat recovery device
10 Foil bearing unit
11 Shaft member
20 Rotating member
21 Sleeve portion
22 Flange portion
22a One end surface
30 Radial foil bearing
40 First thrust foil bearing
41 Foil holder
41a Holder body
41a1 End surface
41b Fixing member
42 Leaf
42a Main body portion
42b Extension portion
50 Second thrust foil bearing
421 Front end
421a Top
422 Rear end
422a Top
423 Inner diameter side edge
424 Outer diameter side edge
Bf Back foil portion
R Rotation direction
S Bearing surface
Tf Top foil portion
A Circumferential length
B Radial Length

The invention claimed is:

1. A thrust foil bearing having a bearing surface formed by arranging a plurality of leaves side by side in a circumferential direction, wherein
each of the leaves has a top foil portion that forms the bearing surface, and
a ratio of a circumferential length of the top foil portion of one of the leaves at a radially central position of the top foil portion, to a radial length from an inner diameter-side edge to an outer diameter-side edge of the top foil portion is 0.55 or more and 0.66 or less.

2. The thrust foil bearing according to claim 1, wherein the ratio of the circumferential length of the top foil portion of one of the leaves at the radially central position of the top foil portion, to the radial length from the inner diameter-side edge to the outer diameter-side edge of the top foil portion is 0.6.

* * * * *